(12) United States Patent
Bookbinder et al.

(10) Patent No.: US 7,475,568 B2
(45) Date of Patent: Jan. 13, 2009

(54) METHOD OF FINING GLASS

(75) Inventors: Andrea Weiss Bookbinder, Corning, NY (US); Adam James Gillmar Ellison, Painted Post, NY (US); David Myron Lineman, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 275 days.

(21) Appl. No.: 11/116,659

(22) Filed: Apr. 27, 2005

(65) Prior Publication Data

US 2006/0242995 A1    Nov. 2, 2006

(51) Int. Cl.
*C03B 5/16* (2006.01)
*C03B 5/00* (2006.01)

(52) U.S. Cl. ............... 65/134.9; 65/134.4; 65/134.1

(58) Field of Classification Search ........... 65/134.1, 65/134.4, 134.9
See application file for complete search history.

(56) References Cited

U.S. PATENT DOCUMENTS

| | | | | |
|---|---|---|---|---|
| 3,338,696 A | 8/1967 | Dockerty | | 65/145 |
| 3,682,609 A | 8/1972 | Dockerty | | 65/83 |
| 3,871,853 A | 3/1975 | Dietz et al. | | 65/32 |
| 4,983,198 A | 1/1991 | Ogino | | 65/32.5 |
| 5,785,726 A | 7/1998 | Dorfeld et al. | | 65/134.1 |
| 5,824,127 A | 10/1998 | Bange et al. | | 65/90 |
| 6,128,924 A | 10/2000 | Bange et al. | | 65/90 |
| 6,401,492 B1 | 6/2002 | Nattermann | | 65/347 |
| 6,629,437 B1 | 10/2003 | Baucke et al. | | 65/134.9 |
| 6,769,272 B2 | 8/2004 | Roeth et al. | | 65/134.9 |
| 6,810,689 B2 * | 11/2004 | Romer et al. | | 65/134.1 |
| 6,993,936 B2 * | 2/2006 | Grzesik et al. | | 65/134.9 |
| 2002/0026811 A1 | 3/2002 | Hoyer et al. | | 65/29.12 |
| 2002/0092325 A1 | 7/2002 | Muschik et al. | | 65/134.3 |
| 2003/0196453 A1 | 10/2003 | Roth et al. | | 65/29.12 |
| 2004/0067369 A1 | 4/2004 | Ott et al. | | 428/432 |
| 2004/0177649 A1 | 9/2004 | Dorfeld et al. | | 65/90 |
| 2004/0206126 A1 | 10/2004 | Roth et al. | | 65/346 |
| 2005/0050923 A1 | 3/2005 | Grzesik et al. | | 65/135.6 |

FOREIGN PATENT DOCUMENTS

| | | |
|---|---|---|
| EP | 0912452 B1 | 10/2003 |
| GB | 1125108 | 8/1968 |
| WO | WO2004/028987 | 4/2004 |
| WO | WO2005/030661 | 4/2005 |

\* cited by examiner

*Primary Examiner*—Steven P Griffin
*Assistant Examiner*—Russell J Kemmerle, III
(74) *Attorney, Agent, or Firm*—Kevin M. Able

(57) ABSTRACT

A method of forming an oxide glass including heating a glass melt having a $\beta_{OH}$ concentration of at least about 0.35 in a vessel comprising a metal selected from the group consisting of platinum, molybdenum, palladium, rhodium, and alloys thereof, there being an interface present between the vessel and the glass, and controlling a partial pressure of hydrogen in an atmosphere in contact with an outside surface of the vessel in an amount such that hydrogen permeation blisters form in a region of the glass adjacent the glass-vessel interface.

14 Claims, 3 Drawing Sheets

METHOD OF FINING GLASS

BACKGROUND OF THE INVENTION

1. Field of the Invention

This invention is directed to a method of forming glasses, particularly those which are relatively arsenic-free, in manufacturing systems which employ especially platinum or molybdenum. The invention is particularly useful for forming high melting or high strain point glasses, e.g. such as are used for glass substrates for flat panel display devices, without having to use such arsenic-containing materials.

2. Technical Background

Liquid crystal displays (LCDs) are passive flat panel displays which depend upon external sources of light for illumination. They are manufactured as segmented displays or in one of two basic configurations. The substrate needs (other than being transparent and capable of withstanding the chemical conditions to which it is exposed during display processing) of the two matrix types vary. The first type is intrinsic matrix addressed, relying upon the threshold properties of the liquid crystal material. The second is extrinsic matrix or active matrix (AM) addressed, in which an array of diodes, metal-insulator-metal (MIM) devices, or thin film transistors (TFTs) supplies an electronic switch to each pixel. In both cases, two sheets of glass form the structure of the display. The separation between the two sheets is the critical gap dimension, of the order of 5-10 μm.

Intrinsically addressed LCDs are fabricated using metal deposition techniques, typically at temperatures ≦350° C., followed by standard metal etching procedures. As a result, the substrate requirements therefor are often the same as those for segmented displays. Soda-lime-silica glass with a barrier layer has proven to be adequate for most needs. A high performance version of intrinsically addressed LCDs, the super twisted nematic (STN) type, has an added requirement of extremely precise flatness for the purpose of holding the gap dimensions uniform. Because of that requirement, soda-lime-silica glass made using the float glass manufacturing process must be polished. Such polishing processes are expensive and time consuming, and generate a large amount of glass particles which have the potential to negatively impact further processing of the glass sheets. Alternatively, glass can be formed using a process which does not require polishing, e.g. fusion downdraw.

Extrinsically addressed LCD's can be further subdivided depending upon the nature of the electrical switch located at each optical element (subpixel). Two of the most popular types of extrinsically (or active matrix, AMLCD) addressed LCD's are those based on either amorphous (α-Si) or polycrystalline (poly-Si) silicon thin film transistors (TFT's).

Many of the glasses manufactured for flat panel display applications, particularly those which are formed by downdraw processes (e.g., the fusion or slot draw processes), are melted or formed using manufacturing equipment comprised of refractory metals, e.g. platinum or platinum alloys. This is particularly true in the fining and conditioning sections of the process, where refractory metals are employed in order to minimize the creation of compositional inhomogeneities and gaseous inclusions caused by contact of the glass with oxide refractory materials. In addition, many of these manufacturing processes employ arsenic as a fining agent. This is because arsenic is among the highest temperature fining agents known, meaning that, when added to the molten glass bath, it allows for $O_2$ release from the glass melt even at high melting temperatures (e.g. above 1450° C.). This high temperature $O_2$ release (which aids in the removal of bubbles during the melting and fining stages of glass production), coupled with a strong tendency for $O_2$ absorption at lower conditioning temperatures (which aids in the collapse of any residual gaseous inclusions in the glass), results in a glass product essentially free of gaseous inclusions. Other fining agents typically melt and release their oxygen far too early when added as fining agents to high melting temperature glasses and reabsorb $O_2$ too late during the conditioning process, thereby disabling their fining and oxygen re-absorption abilities.

From an environmental point of view, it would be desirable to find alternative methods of making such high melting point and strain point glasses without having to employ arsenic as a fining agent. It would be particularly desirable to find methods for making such glasses via downdraw (especially fusion-like) processes. Unfortunately, previous efforts at doing so have been hindered by the production of unacceptable amounts of bubbles (seeds) in the glass. This has been a particular problem with glasses which employ refractory metals such as platinum or platinum-containing alloys in their molten glass delivery systems. This is because such metals (e.g. platinum and molybdenum) can cause an electrochemical reaction to occur with the glass which results in bubble formation at the glass/metal interface, e.g. where the glass contacts the platinum. This bubble formation in the glass/metal contact region is referred to herein as hydrogen permeation blistering.

SUMMARY

Exemplary embodiments of the present invention for forming an oxide glass in a glass manufacturing process are described.

In one broad aspect of the invention, a method of forming an oxide glass in a glass manufacturing process is provided comprising flowing a glass melt having a $\beta_{-OH}$ concentration of at least about 0.35 mm$^{-1}$ in a vessel comprising a metal selected from the group consisting of platinum, gold, molybdenum, palladium, rhodium, iridium, rhenium, tantalum, titanium, tungsten, and alloys thereof, there being an interface present between the vessel and the glass and controlling a partial pressure of hydrogen in an atmosphere in contact with an outside wall surface of the vessel in an amount such that hydrogen permeation blisters or other gaseous products from oxidation reactions form in a region of the glass adjacent the glass-vessel interface. That is, hydrogen permeation blistering is intentionally encouraged in at least portions of certain vessels.

Preferably, the partial pressure of hydrogen in the atmosphere outside the vessel is less than about 100 ppm in the temperature range of about 1450° C. to 1700° C.; more preferably less than about 10 ppm; and most preferably less than about 0.01 ppm. Although the partial pressure of hydrogen in the atmosphere may be controlled by controlling the amount of water in the atmosphere (e.g. controlling the dew point of the atmosphere), the partial pressure of hydrogen may be controlled by introducing other hydrogen-bearing materials into the atmosphere. If water is used to control the partial pressure of hydrogen in the atmosphere, a dew point of the atmosphere is preferably maintained between about −20° C. and +30° C. In some instances it may be desirable for the atmosphere to contain oxygen, however any oxygen should be present in an amount less than about 50 wt. %.

Advantageously, practicing the present invention enables the forming of glass which is essentially free of As or Sb, although the method may be used to form other glasses. The hydrogen permeation blistering within the vessel may be further enhanced by preferentially thinning the vessel walls.

The present invention can also be viewed as providing a method comprising flowing a glass melt having a $\beta_{-OH}$ concentration of at least about 0.35 mm$^{-1}$ in a vessel comprising a metal selected from the group consisting of platinum, gold, molybdenum, palladium, rhodium, iridium, rhenium, tantalum, titanium, tungsten, and alloys thereof, there being an interface present between the vessel and the glass, the vessel further comprising a first portion and a second portion, controlling a partial pressure of hydrogen of a first atmosphere in contact with an outside wall surface of the vessel first portion in an amount such that hydrogen permeation blisters form in a region of the glass adjacent the glass-vessel interface in the vessel first portion, and controlling a partial pressure of hydrogen of a second atmosphere in contact with an outside wall surface of the vessel second portion in an amount such that hydrogen permeation blisters are substantially prevented from forming in a region of the glass adjacent the glass-vessel interface in the vessel second portion.

In still another broad aspect, a method of forming an oxide glass in a manufacturing process is provided, the method comprising flowing a glass melt having a $\beta_{-OH}$ concentration of at least about 0.35 mm$^{-1}$ in a vessel comprising a metal selected from the group consisting of platinum, gold, molybdenum, palladium, rhodium, iridium, rhenium, tantalum, titanium, tungsten, and alloys thereof, there being an interface present between the vessel and the glass, the vessel further comprising a first portion and a second portion, and controlling a partial pressure of hydrogen in a first atmosphere in contact with an outside wall surface of the vessel first portion in an amount such that hydrogen permeation blisters form in a region of the glass adjacent the glass-vessel interface in the first portion.

The invention will be understood more easily and other objects, characteristics, details and advantages thereof will become more clearly apparent in the course of the following explanatory description, which is given, without in any way implying a limitation, with reference to the attached Figures. It is intended that all such additional systems, methods features and advantages be included within this description, be within the scope of the present invention, and be protected by the accompanying claims.

DETAILED DESCRIPTION

Figure 1:
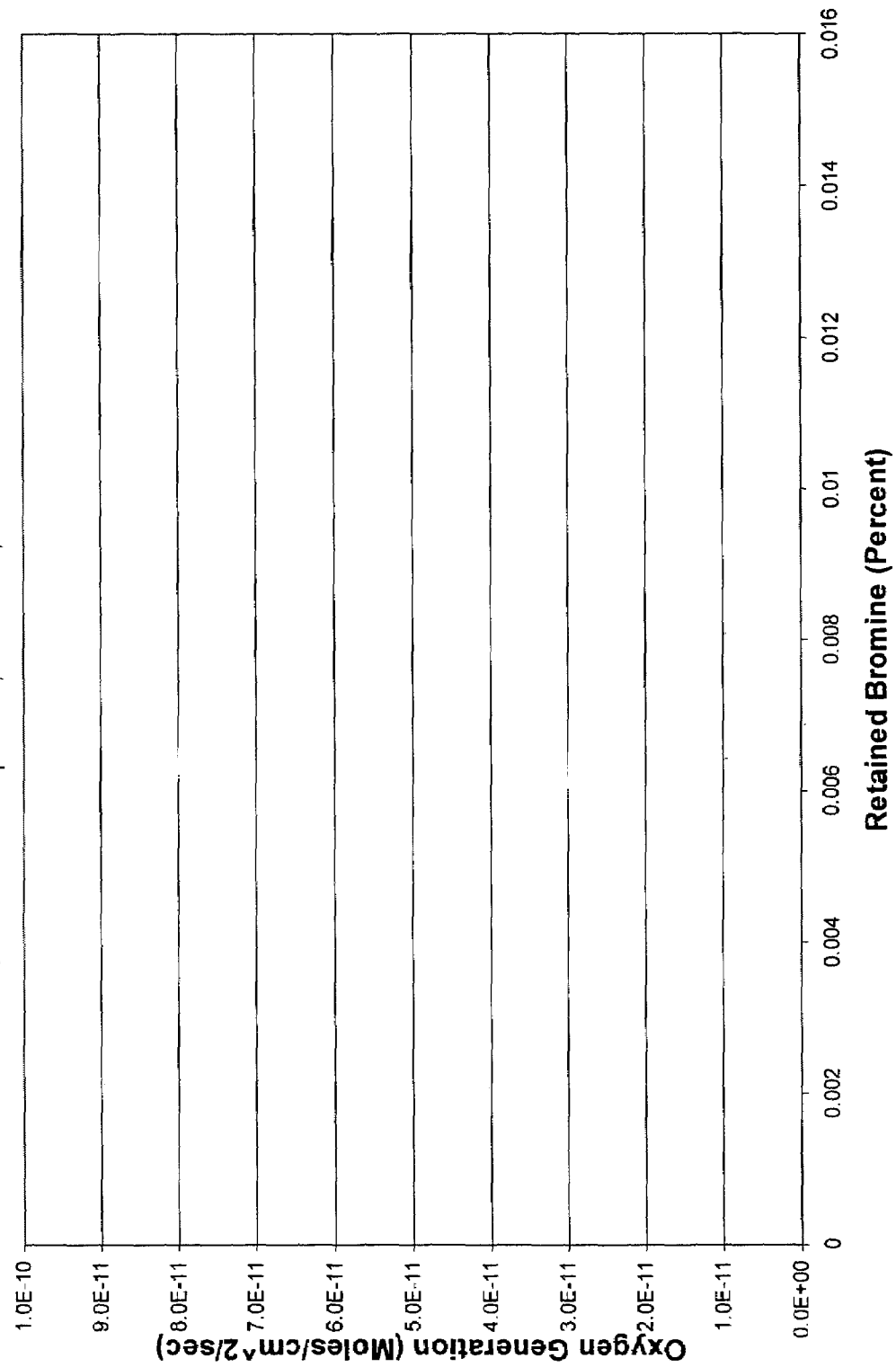
FIG. 1 is a graph depicting oxygen generation as a function of bromine level at a temperature of about 1450° C. and a hydrogen partial pressure of about 1.3 ppm.

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

Arsenic, typically in the form As$_2$O$_5$ has been used for years as a fining agent and typically has comprised 0.9-1.1 wt. percent of the glass. As$_2$O$_5$ is believed to achieve bubble free glass by reducing the arsenic from +5 to +3 at high temperature, after most melting is complete. This reduction releases oxygen. The released oxygen coalesces with remaining bubbles and causes them to rise out of the glass. Arsenic has the additional advantage of assisting in the removal of any additional seeds (bubbles) that may exist in the glass during the conditioning or cooling cycle of the glass. As such, arsenic is an outstanding fining agent, producing virtually bubble-free glass with very little intervention. Unfortunately, it is a toxic material, one of the 8 listed heavy metals for the Resource Conservation and Recovery Act (RCRA). The processing of glass with arsenic results in wastes that are expensive to process and creates disposal issues relative to the display device itself after useful life is exhausted.

Antimony oxide (Sb$_2$O$_3$) is utilized as a substitute for arsenic, but is much less effective since it loses its oxygen at lower temperatures, before melting is complete. Furthermore, antimony is closely related to arsenic in terms of chemical behavior and therefore possesses the same challenge for waste disposal. On the other hand, tin oxide (SnO$_2$) is not toxic and has use as a fining agent, but its very low solubility (approx. 0.2 wt. %) at the forming temperature of LCD glasses limits how much can be added and therefore limits its efficacy.

The concept of glass which is essentially alkali, antimony and/or arsenic-free glass (e.g. having less than about 0.05 wt. % of an alkali, antimony or arsenic) has been previously described. For example, U.S. Pat. No. 6,128,924, the contents of which are hereby incorporated by reference, discloses a group of fining agents that may be employed alone or in some combination as a substitute for arsenic for the production of glasses useful for the fabrication of LCD displays. This group includes: CeO$_2$, SnO$_2$, Fe$_2$O$_3$ and halide containing compounds. Indeed, U.S. Pat. No. 6,468,933 describes a glass forming process that employs a mixture of SnO$_2$ and a halide-containing compound in the form of a chloride (e.g., BaCl$_2$ or CaCl$_2$) as fining agents in a system essentially free of arsenic and antimony.

The present invention makes forming of essentially arsenic (As) and antimony (Sb)-free glasses, even high melting point (greater than about 1500° C.) silicate glass compositions, possible, and relates to a method of melting and forming glasses in platinum or molybdenum-containing manufacturing systems. Indeed, practicing the present invention may eliminate the need for adding multivalent fining agents to the glass altogether, or provide for greatly reduced concentrations thereof. The preferred glasses are aluminosilicate or borosilicate glasses. However, other glasses, including glass containing arsenic and/or antimony, may benefit from the current invention.

The preferred manufacturing process for such glasses is via a downdraw sheet manufacturing process. As used herein, downdraw sheet manufacturing process refers to any form of glass sheet manufacturing process in which glass sheets are formed while traveling in a downward direction. In the fusion or overflow downdraw forming process, molten glass flows into a trough, then overflows and runs down both sides of a pipe, fusing together at what is known as the root (where the pipe ends and the two overflow portions of glass rejoin), and is drawn downward until cool. The overflow downdraw sheet manufacturing process is described, for example, in U.S. Pat.

No. 3,338,696 (Dockerty) and U.S. Pat. No. 3,682,609 (Dockerty). One advantage to the fusion forming process is that the glass sheet can be formed without the exposed glass surface contacting any refractory forming surfaces. This provides for a smooth, contaminant-free surface. In addition, this technique is capable of forming very flat and thin sheets to very high tolerances. Consequently, fusion formed glass sheets, unlike float glass sheets, do not require costly polishing steps for TFT and STN LCD applications.

Other forms of downdraw sheet forming techniques include the slot draw and redraw forming techniques. In the slot draw technique, molten glass flows into a trough having a machined slot in the bottom. The sheets of glass are pulled down through the slot. The quality of the glass is obviously dependent on the accuracy of the machined slot. Redraw processes generally involve pre-forming a glass composition into a block of some shape, then reheating and drawing the glass downwardly into a thinner sheet product.

The glass forming method in accordance with the present invention is, while not limited thereto, particularly advantageous in forming high strain point aluminoborosilicate glasses such as, for example, those having a composition, expressed in terms of weight percent on the oxide basis, of:

| | |
|---|---|
| $SiO_2$ | 40-70 |
| $Al_2O_3$ | 6-25 |
| $B_2O_3$ | 5-20 |
| MgO | 0-10 |
| CaO | 1-15 |
| ZnO | 0-10 |
| SrO | 0-10 |
| BaO | 0-30 |
| $SnO_2$ | 0.03-2.0 |
| $Br^-$ | 0.001-0.06 |

More preferably, the base glass may have a composition expressed in terms of weight percent on the oxide basis of:

| | |
|---|---|
| $SiO_2$ | 58-70 |
| $Al_2O_3$ | 12-22 |
| $B_2O_3$ | 3-15 |
| MgO | 1-8 |
| CaO | 2-12 |
| ZnO | 0-10 |
| SrO | 0-3 |
| BaO | 0-3 |
| MgO + CaO + SrO + BaO | 10-25 |
| SrO + BaO | 0-6 |
| $SnO_2$ | 0.1-0.2 |
| $Br^-$ | 0.02-0.04 |

Other components may be added to enhance certain features of the glass including $ZrO_2$, $TiO_2$, $Fe_2O_3$, $Ta_2O_5$, etc., up to 5% in total.

During the glass batching step, a combination of $SnO_2$ and bromine may be added as a fining agent to the glass batch. Preferably, $CaBr_2$ is batched, but bromine may be batched from other raw material sources such as $BaBr_2$. Bromine volatilization during the early melting process is quite high and as such, batching of $CaBr_2$, for example, should preferably be limited to 1.5 weight percent, and more preferably about 1.0 weight percent. Since $Br^-$ is only slightly soluble in the glasses disclosed, the resultant glass composition will display a Br content of between 0.01 and 0.09 wt. %, more typically between about 0.01 and 0.09 wt. %.

Higher levels of $SnO_2$ are preferred for fining and serve to effectively reabsorb any residual seeds during the conditioning or cooling cycle of the glass. However, too high a level of tin, typically above 0.2 weight percent retained in the glass, may result in crystalline tin phase (cassiterite) formation during the fusion draw process. As such, $SnO_2$ is preferably batched in a range that will enable this targeted retention, but which unfortunately further diminishes the fining efficacy When the glass batch is melted and heating increases, batch decomposition and degassing occurs. Oxygen is generated as a result of chemical reaction following the variation in valance of $SnO_2$. As previously described, tin is believed to also assist in reabsorbing remaining seeds during the cool-down process and prior to the fusion sheet forming process. The bromide is decomposed and volatilized to produce bromine gas or a bromine compound gas. As such, small bubbles are removed from the glass melts in the early stages of melting.

It should be noted that in some embodiments, antimony (in the form of $Sb_2O_3$) may be utilized instead of or in addition to $SnO_2$ since its toxicity is less than that of arsenic. In such instances, $Sb_2O_3$ should be present in the final composition in an amount not exceeding 3.0 weight percent, and more preferably with the range of 0.05-1.5 weight percent.

Unfortunately, as indicated above, Br volatilizes relatively early in the melting process, typically within the first 5 minutes, and to near completion in 45 minutes. Laboratory studies have shown that the oxidation of Br— to $Br_2$ may increase the propensity for the formation of hydrogen permeation blisters at the glass-platinum boundary. These blisters may in turn generate larger blisters which release from the glass-platinum boundary and rise through the glass, well after most of the bromine has melted away. Indeed, it has been found that when bromine is present in the glass, hydrogen permeation blistering is enhanced, and when the amount of bromine which is retained in the glass exceeds a level of about 0.004 wt. %, hydrogen permeation blistering, wherein the blisters contain both oxygen and bromine, or compounds thereof, abruptly covers a much larger surface area of the platinum, and the blisters, which also contain bromine gas, are larger than in Br-free glass. Thus, it is desirable, although not necessary, that the glass contain a halide to enhance blistering, preferably I, Br or Cl, during the fining process. If the halide is bromine, the amount of bromine should be between about 0 and 0.09 wt. %; for iodine, between 0 and 0.01 wt. %; and for Cl, between about 0 and 0.4 wt. %. It should be understood that such halides may be used singly, or in combination. For example, FIG. 1 shows the results of an experiment wherein the amount of oxygen released relative to the level of retained bromine in a platinum-containing finer tube surrounded by an atmosphere having an hydrogen partial pressure of about 1.3 ppm at a temperature of 1450° C. and wherein the glass had a residence time in the fiber tube of about 20 minutes. The dew point of the atmosphere was about 20° C. The glass had a composition of about 16.5 wt. % $Al_2O_3$, 10.5 wt. % $B_2O_3$, 7.5 wt. % CaO, 1.3 wt. % MgO, 0.78 SrO, 62 wt. % $SiO_2$, 0.014 BaO, 1.25 wt. % $SnO_2$, 0.01 wt. % Br and 0.08 wt. % $ZrO_2$.

It has been observed that hydrogen permeation blisters occur whenever "wet" glass is in contact with platinum which is in turn in contact with dry air, or air with a low partial pressure of hydrogen. Hydrogen permeation blisters form spontaneously in wet glass having high bromine levels when in contact with platinum that is in turn in contact with wet air, and the partial pressure of $H_2$ in the air surrounding the platinum that will effectively eliminate hydrogen permeation blisters is much higher than in corresponding bromine-free glass.

Advantageously, the present invention may be used to exploit the beneficial characteristics of $SnO_2$ and halide fining while overcoming their disadvantages (e.g. the tendency to increase $H_2$ permeation blisters). Broadly, the present invention includes forming a glass having a dissolved water level corresponding to a —OH level of at least about 0.35 mm$^{-1}$. Preferably, the glass has a low level of a volatile halide, preferably chlorine, bromine or iodine. The glass is then subjected to at least two stages of melting: a) traditional primary melting of solids into a liquid in a refractory-lined vessel; and b) removal of essentially all gaseous inclusions in a precious metal (preferably platinum or a platinum-alloy) vessel, the outside of which is purged with a gas low in hydrogen or a hydrogen-bearing phase, thus inducing rapid hydrogen permeation blistering within the glass melt. In addition, it is preferable to then transition the glass into a platinum-based conditioning vessel, the outside of which is purged with air containing little or no oxygen and a very high concentration of water or other hydrogen-generating gas phase to shut off the hydrogen permeation blister mechanism and absorb any remaining oxygen.

While not wishing to be bound by theory, it is believed that the bubble forming surface blistering effect, which occurs in platinum systems for example, occurs as a result of the formation of an oxygen rich layer near the platinum-glass melt interface. It is believed this oxygen-rich layer in the glass is produced by a combination of thermoelectric electrolysis of the melt, breakdown of oxide fining agents, and the number of OH groups dissolved in the glass. The latter effect is believed to have a large impact on the rate of blistering as a result of contact of the glass with the platinum. It is also believed that OH groups dissociate into neutral hydrogen and oxygen. The hydrogen can then permeate the platinum skin, enriching the surface region (platinum contacting region) of the glass with oxygen. If the solubility limit of the glass is exceeded, bubbles may form. Thus, by increasing the relative partial pressure of hydrogen outside the system, hydrogen permeation through the platinum metal can be controlled so that bubble generation is reduced.

Control of the partial pressure of hydrogen on the exterior surface of the glass-containing vessel can be achieved, for example, by controlling the amount of water, oxygen and inert gas in the atmosphere surrounding the platinum-containing vessels which comprise the glass forming apparatus. The hydrogen level on the exterior surfaces of glass-containing platinum vessels may be determined by the thermodynamic equilibrium of the water decomposition reaction $H_2O \rightarrow H_2 + \frac{1}{2}O_2$. In accordance with thermodynamic tables, the free energy (ΔG) for the water decomposition reaction is equal to 58,900-13.1T, where T is the temperature in degrees Kelvin and G is the free energy in calories per mole. At a given temperature, the equilibrium constant for the water reaction can be calculated by using the relationship $K_{eq} = e^{-G/T}$, where G and T are as previously noted, and R is the universal gas constant. Once $K_{eq}$ is known, the ratio of the partial pressures of the various gases involved in the water breakdown can be calculated where $K_{eq} = [(pH_2)(pO_2)^{1/2}]/pH_2O$ (where pN indicates the partial pressure of N). For example, at 1450° C., $K_{eq}$ is equal to $2.47 \times 10^{-5}$. Thus, if a 75° F. dew point air environment ($pH_2O$ of 0.030 atmospheres) is heated to 1450° C., then $pH_2$ is calculated to be $1.59 \times 10^{-6}$ atmospheres (1.59 ppm).

Such an approach is disclosed, for example, in the co-pending application U.S. patent application No. 11/116669 filed on Apr. 27, 2005, the contents of which are incorporated herein in their entirety by reference, wherein the platinum-containing portions of the manufacturing system are enclosed in a humidity jacket. The partial pressure of hydrogen in the atmosphere surrounding and in contact with the platinum-containing vessels is controlled by adjusting the dew point of and partial pressure of oxygen in the atmosphere. This controlled, high hydrogen partial pressure atmosphere counters the diffusion of hydrogen from the glass through the platinum vessel and into the atmosphere. This would remove a significant contributor to the oxidized boundary layer in the platinum system and could act, in addition, to reduce any excess oxidation by converting dissolved $O_2$ to OH groups in the glass melt. The overall impact is to minimize or suppress hydrogen permeation blister formation in the melting and forming sections of the manufacturing process which employ platinum.

Such methods as just described are useful in traditional glass making processes where effective fining agents are introduced as batch materials into the glass melt. In such processes, much of the removal of dissolved gases occurs in the melting vessel, prior to the introduction of the molten glass into the fining vessel. However, when less effective fining agents are used, other means of eliminating dissolved blister-forming gases are needed.

In accordance with the present invention, rather than suppress the generation of hydrogen permeation blisters at the platinum-glass interface as is done in a traditional glass manufacturing process, hydrogen permeation blistering at the platinum-glass interface(s) is encouraged by decreasing the partial pressure of hydrogen in the atmosphere surrounding the platinum-containing vessel in which fining occurs, at least over a portion of the exterior platinum surfaces, thereby increasing the removal of dissolved gases within the molten glass.

Figure 2:
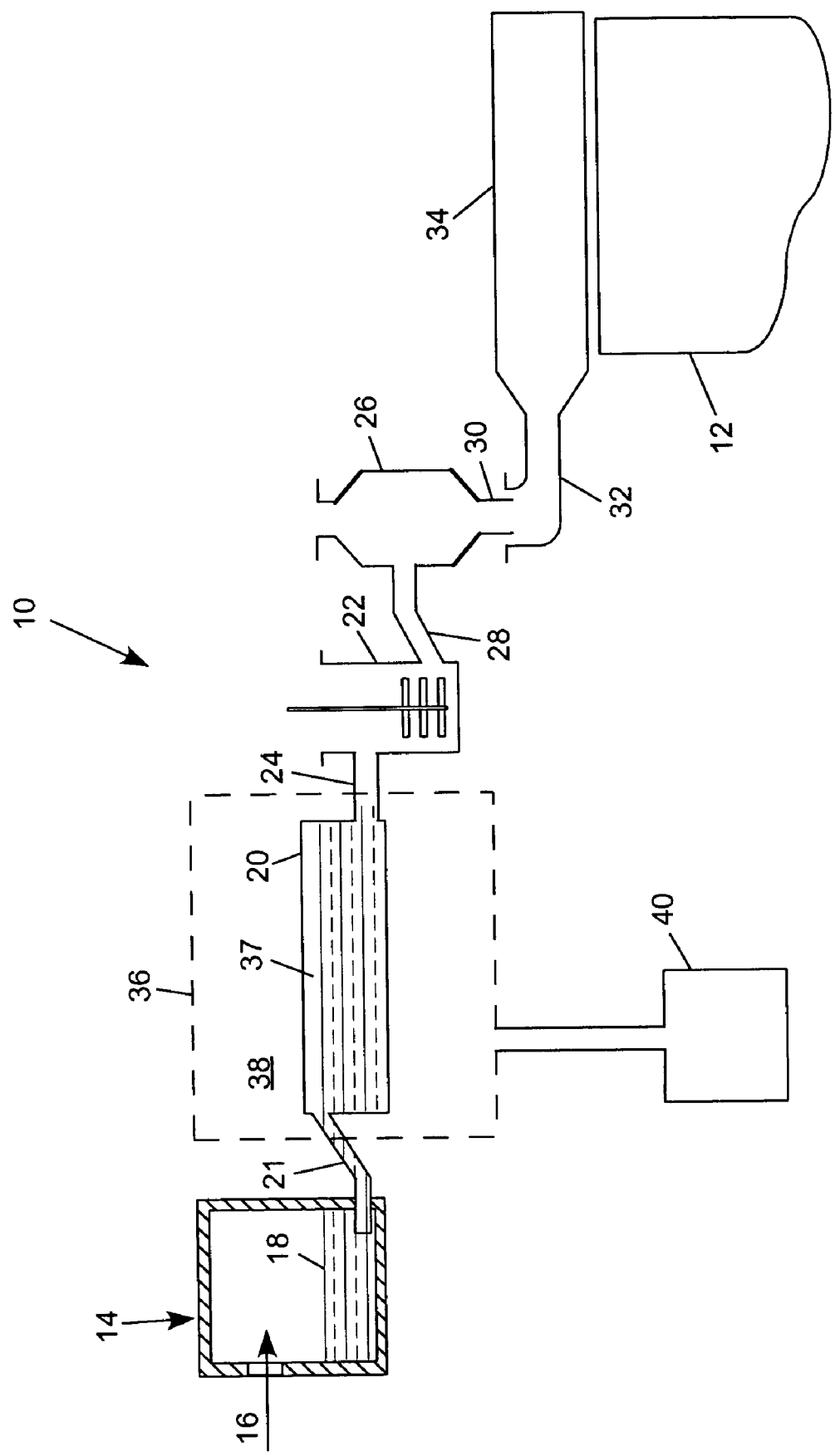
FIG. 2 is a block diagram that shows the components of a glass manufacturing system in accordance with the present invention.

Referring to FIG. 2, there is shown a schematic view of an exemplary glass manufacturing system 10 that uses the fusion process to make glass sheets 12 in accordance with the present invention. The glass manufacturing system 10 includes a melting vessel 14 in which batch materials are introduced as shown by arrow 16 and then melted to form molten glass 18. Melting vessel 14 is typically made from a refractory material, such as refractory (e.g. ceramic) brick. The glass manufacturing system 10 further includes components that are typically made from platinum or platinum-containing metals such as platinum-rhodium, platinum-iridium and combinations thereof, but which may also comprise such refractory metals as molybdenum, palladium, rhenium, tantalum, titanium, tungsten, and alloys thereof. The platinum-containing components include fining vessel 20 (e.g. finer tube 20), a melter to finer connecting tube 21, a mixing vessel 22 (e.g. stir chamber 22), a finer to stir chamber connecting tube 24, a delivery vessel 26 (e.g. bowl 26), a stir chamber to bowl connecting tube 28, a downcomer 30 and an inlet 32. Inlet 32 is coupled to forming vessel 34 (e.g. fusion pipe 34) which forms glass sheet 12. Typically, forming vessel 34 is made from a refractory material.

In accordance with an embodiment of the present invention, finer tube 20 is encapsulated or encased within a capsule 36. Finer tube 20 comprises a platinum and/or molybdenum-containing metal vessel (e.g. a pipe) through which molten glass from melter 14 flows. Although the finer tube as disclosed herein is described as a platinum-containing vessel, it should be understood that fining vessels formed from other suitable metal or metal alloys may benefit from the present invention, thus the fining tube may be comprised of gold, molybdenum, palladium, rhodium, iridium, rhenium, tantalum, titanium, tungsten, and alloys thereof, for example. A jacket volume 38 is defined between the interior walls of capsule 36 and the exterior walls of finer tube 20. Although it is believed that the configuration of capsule 36 is not critical, as its function is to maintain a particular partial pressure of hydrogen rather than exclude a gas, it should preferably be relatively leak tight to the extent that it may be used for maintaining an atmosphere inside the jacket volume 38 which contains the requisite partial pressure of hydrogen. Vacuum tightness is not required. In some cases, it may be desirable for the atmosphere to contain oxygen. While oxygen in the capsule atmosphere beneficially serves as a scavenger for hydrogen, thereby providing a method of controlling the partial pressure of hydrogen via the foregoing reactions, the presence of oxygen may contribute to a reduced finer tube lifetime. Oxygen may be included in the atmosphere, for example, in an amount greater than about 10 wt. % oxygen, but in any event, preferably in an amount less than about 50 wt. %. If oxygen is present in an amount greater than about 50 wt. %, undesirably rapid oxidation and deterioration of the finer tube may occur.

A positive pressure is preferably employed within the capsule 36 so that air from the atmosphere outside the capsule is not introduced into the inside of the capsule. For platinum-containing systems, it is desirable to maintain as low a partial pressure of hydrogen within capsule 36 as possible. Preferably, the partial pressure of hydrogen within the capsule 36 atmosphere is less than about 100 ppm; more preferably less than about 10 ppm; and most preferably less than about 0.01 ppm in the temperature range from about 1450° C. to about 1700° C. As the glass flows through finer tube 20, air space 37 is maintained above the free glass surface for collecting gases which come out of solution within the finer tube.

The traditional enclosure for finer tube 20, as well as other components of glass making system 10 is a room size enclosure. The traditional enclosure ensures that the partial pressure of hydrogen outside components 20, 22 and 26, for example, is in an amount sufficient to prevent formation of hydrogen permeation blisters in the glass that is adjacent to the vessel/glass interface. Although the traditional enclosure successfully reduces the formation of gaseous inclusions in glass sheets, it still has drawbacks. First, the traditional enclosure is so large that it is difficult if not impossible to maintain a uniform environment around the components 20, 22 and 26. Second, the traditional enclosure is so large and the environment so hot and humid that it can be uncomfortable to people that must walk through or work in the enclosure.

Capsule 36 of the present invention addresses these drawbacks and other drawbacks associated with the traditional enclosure. Capsule 36 is a relatively small enclosure (relative to a traditional room-sized enclosure) that produces a small jacket volume 38 which facilitates better control of the atmosphere within the volume. Capsule 36 can be a simple container or barrier that is capable of maintaining a desired environment in contact with the finer tube. For instance, capsule 36 can be as simple as a plastic or rubber bag, or something more permanent, such as the enclosure shown in FIG. 2. Preferably, jacket volume 38 comprises a material which is both resistant to the high temperature typically encountered at the finer tube (e.g. 1450° C.-1700° C.) and sufficiently insulating to prevent heat loss from the finer tube, and which provides for a controllable atmosphere in contact with finer tube 20. In a preferred embodiment, jacket volume 38 is filled with a porous refractory material, such as a porous concrete, which is on one side in contact with the outside surface of finer tube 20. The porous concrete beneficially serves as a support for the finer tube, and is sufficiently porous that the atmosphere contained therein may contact the finer tube. The outside surface of the refractory filler may be clad with, for example, stainless steel. The stainless steel serves both as a structural support for the filler and as a connection point for piping and other apparatus which may be used to deliver and control the atmosphere within the capsule. The relatively small jacket volume ensures that a probe reading of the atmosphere (such as relative humidity or dew point) for conditions inside capsule 36 (i.e. within jacket volume 38) is more likely to be representative of conditions at the exterior surfaces of finer tube 20 because jacket volume 38 is smaller than the volume in traditional enclosures. In addition, if there is a process instability or change in the water content of molten glass 18, then there is often no way to respond to this problem using the traditional enclosure, since it may be operating at a maximum dew point, for example. Capsule 36 and controller 40 have a better chance of solving this problem.

As shown in FIG. 2, capsule 36 can be made as one zone or section which encloses the entire length of finer tube 20. The upper limit of the partial pressure of hydrogen within jacket volume 38 depends on a number of factors, including the particular glass being melted, the fining agents employed, and whether the manufacturing system employs molybdenum, platinum or another metal. For example, for glass compositions set forth above, a controlled partial pressure of hydrogen less than about 100 ppm in jacket volume 38 is suitable to incur a large amount of hydrogen permeation blistering within the metal finer tube, which blistering dissipates as the glass moves downstream within the vessel. Some heating is expected simply by enclosing the high temperature section of the manufacturing process which employs platinum metal, and thus additional heating of jacket volume 38 may or may not be necessary. However, if necessary, heating of finer tube 20 may be accomplished, for example, by flowing an electrical current through the metal fining tube. Controller 40 is used to introduce a hydrogen-bearing material into the atmosphere within jacket volume 38, for example, by employing common techniques used in humidifiers, or boiling or flash vaporizing a controlled flow of water, if needed or desired. A suitable controller may be a humidity controller such as a Dew Point Humidifier (DPH) system manufactured by Arbin Instruments. If humidity is used to control the hydrogen partial pressure within capsule volume 38 (within capsule 36), the dew point of the atmosphere is preferably maintained between about −20° C. and +30° C. However, water vapor is only one method of introducing hydrogen into the capsule and therefore controlling the hydrogen partial pressure. Hydrogen gas, for example, could be employed to control the hydrogen partial pressure. A mixture of primarily nitrogen gas, with a percentage of hydrogen gas mixed in, as another example, could be pumped into the enclosure, the percentage of hydrogen being varied as desired. Advantageously, a gas mixture having essentially no oxygen prolongs the service life of the finer tube, as the metal or metals comprising the finer tube rapidly oxidize at the temperatures present at the fiber tube, e.g. 1450° C. to 1700° C. Alternatively, other hydrogen-bearing materials may be employed, such as methane gas, ammonia, cracked ammonia products and/or combustion products. The atmosphere within jacket volume 38 may be flowing or static.

Once the glass leaves finer tube 20, it is desirable that the hydrogen permeation blistering which was induced within the finer tube is suppressed as the glass exits finer tube 20 and enters stir chamber connecting tube 24 and stir chamber 22. This may be done, for example, in accordance with the method described in co-pending application U.S. patent application No. 11/116669, wherein the other platinum-containing process vessels downstream of the finer tube are enclosed in a capsule separate from the finer capsule, and in which a high partial pressure of hydrogen is maintained to suppress hydrogen permeation blistering.

Preferably, the water content in the glass being formed in accordance with the present invention is maintained at a relatively high level. One manner of measuring the water content in the glass is by measuring beta$_{—OH}$ ($\beta_{—OH}$). $\beta_{—OH}$, as used herein, is a measure of the hydroxyl content in the glass as measured by IR spectroscopy, and is determined using the fundamental hydroxyl absorption, which for this material occurs at about 2800 nm. The $\beta_{—OH}$ is the linear absorption coefficient (absorbance/mm thickness) of the material at 2809 nm. The equation below shows how $\beta_{—OH}$ is calculated from the sample's IR transmittance spectrum.

$$\beta_{—OH} = (1/X)\text{LOG}_{10}(Tr_1/Tr_2)$$

where X is the sample thickness in millimeters, $Tr_1$ is the sample transmittance at the reference wavelength (2600 nm) and $Tr_2$ is the minimum sample transmittance of the hydroxyl absorption wavelength (2809 nm). The reference wavelength compensates for signal loss due to surface reflections, scatter, and refraction in the sample, and is chosen from a region of no absorption and as close as possible to the absorption wavelength of interest.

In a preferred embodiment of the present invention, the batch constituents are selected so that the resultant glass formed in melting vessel 14 has a water content therein, as indicated by $\beta_{—OH}$ level, which is at least about 0.35 mm$^{-1}$; more preferably at least about 0.4 mm$^{-1}$; even more preferably at least about 0.45 mm$^{-1}$, and most preferably at least about 0.5 mm$^{-1}$. The water content or $\beta_{—OH}$ value of the glass can be increased in a variety of ways. For example, a water-rich cover gas may be employed in melting vessel 14.

Preferably, the glasses formed in accordance with the invention are essentially free of arsenic and/or antimony. Even when formed using a downdraw sheet forming process employing a platinum-based metal delivery system, arsenic and/or antimony free glasses can be formed without any significant amounts of electrochemical blistering occurring. In the most preferred embodiment, in order to facilitate fining of these glasses, a volatile halide, such as Br, Cl, I, or a combination thereof, is added to such glasses in an amount which results in the final glass having a composition containing less than about 0.1 weight percent (wt. %) volatile halide.

Additionally, it is desirable to keep the sum of the partial pressures of all volatile gases dissolved in the glass below 1 atmosphere. One method of facilitating this result is by limiting the amount of sulfur in the resultant glass by appropriate selection of batch materials. Preferably, selection of batch materials should be made so that the sulfur, (expressed as $SO_3$) in the resultant formed glass is as low as possible, preferably less than 100 ppm, more preferably less than 50 ppm, and most preferably less than 25 ppm.

Preferred glasses formed in accordance with the present invention exhibit linear coefficients of thermal expansion over the temperature range of 0°-300° C. between 32-46×10$^{-7}$/° C., more preferably between 32-40×10$^{-7}$/° C.; strain points higher than 630° C., more preferably higher than 640° C., and most preferably greater than 650° C.; liquidus temperatures less than 1125° C.; liquidus viscosities which are sufficient to enable formation by a downdraw manufacturing process, preferably greater than about 100,000, and more preferably greater than about 400,000 poises; a weight loss of less than about 2 mg/cm$^2$ after immersion for 24 hours in an aqueous 5% by weight HCl solution at about 95° C.; long term stability against devitrification at melting and forming temperatures, and melting viscosities of about 200 poises at less than about 1675° C. The methods of the present invention may be employed in glasses having compositions within the boundaries set forth above, such as, for example, glasses listed as examples in U.S. Pat. No. 5,374,595, thereby enabling such glasses to be fined and formed without having to use arsenic.

It is believed that the methods described herein are applicable to a wide variety of glasses, particularly those formed via downdraw manufacturing processes which employ, for example, platinum, molybdenum or alloys thereof in their formation. The optimum hydrogen partial pressure for a given glass manufacturing process will vary depending on a variety of factors, including the particular manufacturing process and the glass composition being formed.

As described above, controller 40 controls the partial pressure of hydrogen within a single capsule 36 surrounding finer tube 20 to encourage rather than suppress the generation of hydrogen permeation blistering within finer tube 20. In effect, the low hydrogen partial pressure of the atmosphere within jacket volume 38 induces the rapid generation of bubbles (blisters) containing oxygen and other gaseous inclusions resulting from oxidation reactions in the glass—the glass boils. The resulting bubbles serve as coalescence points, wherein dissolved gases migrate to the generated bubbles. The bubbles subsequently grow in size (and buoyancy) and rise to the surface of the glass within finer tube 36 and are evacuated. However, the skilled artisan will realize that a more refined method of controlling hydrogen permeation blistering within fining tube 20 may be desirable. This is because the transition between the strong hydrogen permeation blistering induced within the finer tube and the suppression of blistering which is desirable in platinum vessels downstream of the finer tube can be indeterminate. By utilizing a plurality of capsule sections surrounding the finer tube, the hydrogen permeation blistering which is induced within the finer tube can be more easily controlled, and hydrogen permeation blistering suppressed in a more controlled fashion prior to the glass leaving the finer tube. The degree of control needed to transition between rapid hydrogen permeation blistering and a suppression of hydrogen permeation blistering is driven largely by the acceptable defect levels. As customer requirements drive defect levels lower, additional control, in the form of additional finer tube capsule sections for example, may be required.

Figure 3:
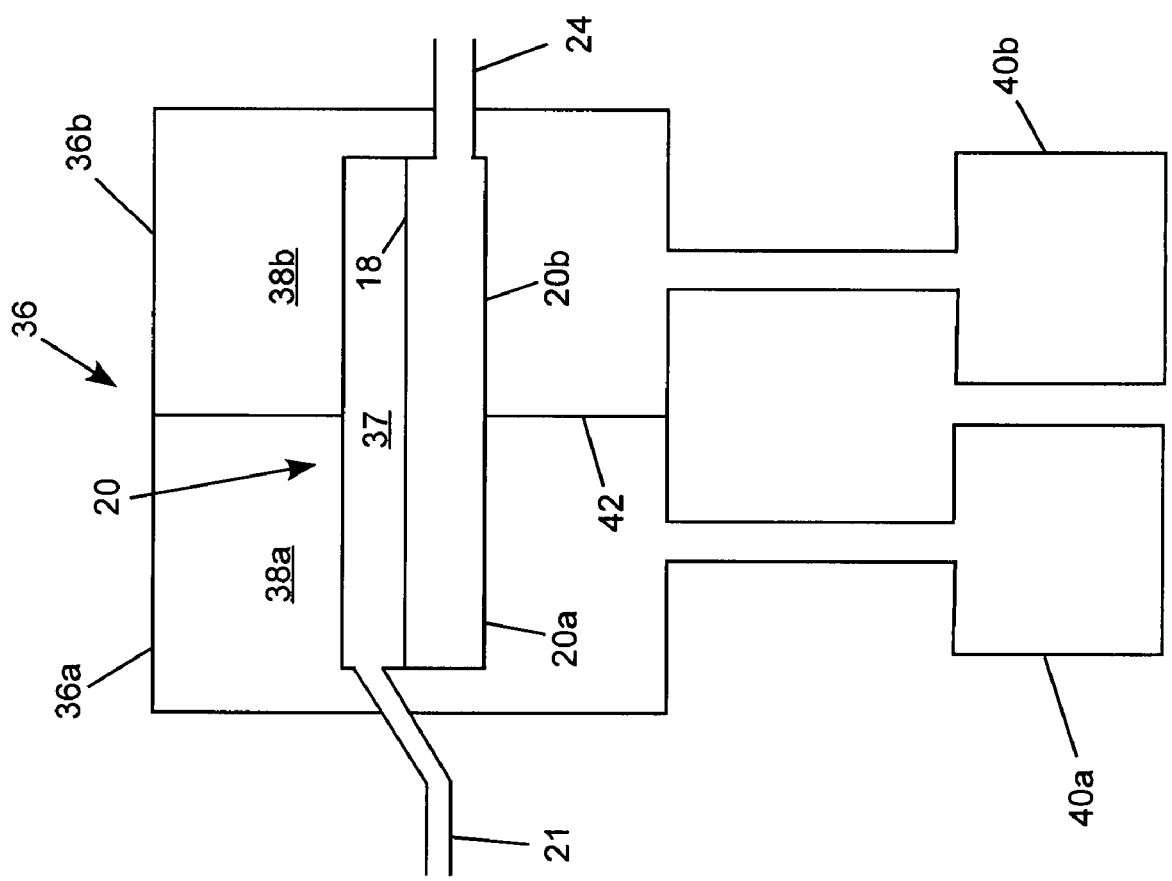
FIG. 3 is a cutaway view of a finer tube in accordance with an embodiment of the present invention, the finer tube being surrounded by a capsule having more than one section.

In a preferred embodiment according to the present invention, illustrated in FIG. 3, capsule 36 is divided into two or more sections, including at least a first section 36a surrounding a first portion 20a of finer tube 20 wherein the partial pressure of hydrogen within the atmosphere of the first section (i.e. within volume 38a) may be controlled between about 100 and 0.01 ppm, and a second section 36b surrounding a second portion 20b of the finer tube 20 downstream (relative to the direction of glass flow) of the first section wherein the partial pressure of hydrogen within the atmosphere of the second section (i.e. within volume 38b) may be controlled between about 1 ppm and 38,000 ppm. If humidity is used to control the partial pressure of hydrogen within capsule sections, a preferred dew point within the first atmosphere is between about −50° C. and about +30° C., and a preferred dew point for the atmosphere of the second section is between about +30° C. to about +95° C. As in the previous embodiment, it may in some cases be desirable to include oxygen within the first atmosphere in an amount greater than about 10 wt. %; but in any event less than about 50 wt. %. The amount of oxygen in the first atmosphere, if present, should be weighed against the undesirable effect of a reduced finer tube lifetime as previously described. The amount of oxygen within the second atmosphere is preferably less than about 1000 ppm. The division between capsule sections need not be airtight, and may comprise, for example, baffle 42 which extends from the inside wall of the capsule to the outside wall, or nearly to the outside wall of the finer tube. It is necessary only that an atmosphere be maintained within first section 36a of capsule 36 that is different that the atmosphere within the second section 36b of capsule 36, most notably in terms of maintaining a minimal hydrogen partial pressure in the first section and a high partial pressure of hydrogen in the second section. Thus, each section is preferably separately controllable, and preferably comprises its own, separate controller 40a, 40b for controlling the partial pressure of hydrogen within its respective capsule section.

According to still another embodiment of the present invention, the degree of hydrogen permeation blistering induced within finer tube 20 may be further enhanced by varying the thickness of the finer tube: a thinner tube results in a higher permeation rate of hydrogen through the tube from the glass-vessel interface to the atmosphere surrounding the vessel, and therefore increased hydrogen permeation blistering within the glass melt at the vessel-glass interface. Moreover, the tube may be preferentially thinned to increase hydrogen permeation blistering in only designated portions of the tube. In addition to allowing more selective control of hydrogen permeation blistering, preferential thinning of the tube may aid in avoiding excessive temperatures and subsequent damage to the tube if the tube is resistively heated (i.e. a current is flowed through the tube to heat the glass). Alternatively, bubble size and releaseability (i.e. the tendency for the bubble to release from the platinum surface) may be further controlled by preferentially reducing (or conversely increasing) the thickness of the tube via dimples (dots of varied tube thickness) in a manner reminiscent of golf balls. Dimpling may cover all or a portion of finer tube 20.

Although the invention has been described in detail for the purpose of illustration, it is understood that such detail is solely for that purpose and variations can be made therein by those skilled in the art without departing from the spirit and scope of the invention which is defined by the following claims. For example, while many of the principles described herein have been described with respect to platinum manufacturing vessels, these principles are equally applicable to manufacturing vessels employing molybdenum, palladium, rhodium, or alloys thereof. All such modifications and variations are intended to be included herein within the scope of this disclosure and the present invention and protected by the following claims.

What is claimed is:

1. A method of forming an oxide glass in a manufacturing process comprising:

flowing a glass melt having a $\beta_{-OH}$ concentration of at least about 0.35 mm$^{-1}$ through a vessel comprising a metal selected from the group consisting of platinum, gold, molybdenum, palladium, rhodium, iridium, rhenium, tantalum, titanium, tungsten, and alloys thereof, there being an interface present between the vessel and the glass, the vessel further comprising a first portion and a second portion;

controlling a partial pressure of hydrogen of a first atmosphere in contact with an outside wall surface of the vessel first portion in an amount such that hydrogen permeation blisters form in a region of the glass adjacent the glass-vessel interface in the vessel first portion; and controlling a partial pressure of hydrogen of a second atmosphere in contact with an outside wall surface of the vessel second portion in an amount such that hydrogen permeation blisters are substantially prevented from forming in a region of the glass adjacent the glass-vessel interface in the vessel second portion.

2. The method according to claim 1 wherein the partial pressure of hydrogen in the first atmosphere is controlled by varying an amount of water in the first atmosphere and a dew point of the first atmosphere is between −50° C. and +30° C.

3. The method according to claim 1 wherein the partial pressure of hydrogen in the second atmosphere is controlled by varying an amount of water in the second atmosphere and a dew point of the second atmosphere is between +30° C. and +95° C.

4. The method according to claim 1 wherein the first atmosphere comprises less than about 50 wt. % oxygen.

5. The method according to claim 1 wherein the second atmosphere comprises less than about 1000 ppm oxygen.

6. The method according to claim 1 wherein the vessel is preferentially thinned.

7. The method according to claim 1 wherein the glass is essentially free of As or Sb.

8. The method according to claim 1 wherein the glass comprises a halide selected from the group consisting of I, Br, Cl, and combinations thereof.

9. The method according to claim 8 wherein the glass comprises Br in an amount between about 0 and 0.09 wt. %.

10. A method of forming an oxide glass in a manufacturing process comprising:

melting batch materials in a melter to produce a glass melt having a $\beta_{-OH}$ concentration of at least about 0.35 mm$^{-1}$;

flowing the glass melt from the melter through a platinum or platinum alloy tube surrounded by a capsule, the capsule comprising a first section containing a first atmosphere in contact with an outside wall surface of a first portion of the tube and a second section containing a second atmosphere different from the first atmosphere and in contact with an outside wall surface of a second portion of the tube; and controlling a partial pressure of hydrogen in the first atmosphere to encourage the formation of hydrogen permeation blisters in a region of the glass melt adjacent a glass-vessel interface in the vessel first portion.

11. The method according to claim 10 further comprising controlling a partial pressure of hydrogen in the second atmosphere such that hydrogen permeation blisters are substantially prevented from forming in a region of the glass adjacent a glass-vessel interface in the second portion.

12. The method according to claim 11 wherein a dew point of the second atmosphere is between about +30° C. and +70° C.

13. The method according to claim 11 wherein a dew point of the first atmosphere is between about −50° C. and +30° C.

14. The method according to claim 10 wherein the capsule defines a jacket volume between the tube and the capsule, the jacket volume being filled with a porous refractory material.

* * * * *